3,141,859
SOLUTIONS OF POLYESTERS
Howard E. Sheffer, Burnt Hills, and Manuel A. Jordan, Schenectady, N.Y., assignors to Schenectady Chemicals, Inc., a corporation of New York
No Drawing. Filed Sept. 26, 1960, Ser. No. 58,198
14 Claims. (Cl. 260—33.4)

This invention relates to highly polymeric linear polyesters, and to insulated electrical conductors coated therewith. More particularly, the present invention relates to the preparation of solutions of polyesters derived from glycols or ester-forming derivatives thereof and aromatic dicarboxylic acids or ester-forming derivatives thereof in a form suitable for use as wire enamels, and to electrical conductors coated with such esters.

Highly polymeric linear polyesters, e.g., polyethylene terephthalate, have been proposed as insulants for electrical conductors since their excellent electrical and physical properties are unsurpassed. However, it has been difficult to dissolve esters of sufficiently high molecular weight for use as an insultant. Insulating compositions based on known solvents for the polyesters have such a low solids content that in order to build up insulation of sufficient thickness many coatings of the composition must be applied. This necessarily has rendered more difficult the problem of coating the conductor.

In an attempt to overcome this difficulty, it has been proposed to coat electrical conductors from a dispersion of a polyester in a non-solvent with subsequent heat treatment such that the solvent is removed and the discrete particles of the polyester are fused together. However, the fusion of the polyester is erratic and a continuous coating is difficult to obtain.

It has also been proposed to coat electrical conductors with solutions of modified polymeric esters of aromatic dicarboxylic acids, said modified esters being more easily dissolved. For example, a polymeric ester of glycerine or pentaerythritol with terephthalic acid has been prepared in the presence of a water immisicble solvent taken from the group consisting of tertiary amines, dialkyl amides, ketones and esters of fatty acids, and certain esters and ethers of ethylene glycol and polyethylene glycol. However, the solvents employed are relatively expensive. Moreover, completely satisfactory wire enamels have not been obtained by such a process. If the polyester is modified by a silicone, there is improved adhesion and flexibility, but, again, the final product leaves something to be desired.

It has been suggested to replace part of the aromatic dicarboxylic acid, e.g., terephthalic acid, with certain aliphatic dicarboxylic acids, but this method is also not a complete solution to the problem.

Another suggestion has been made to coat electrical conductors with a solution of a polymeric ester of either terephthalic acid or isophthalic acid with a mixture of alcohols, ethylene glycol and a polyhydric alcohol, such as glycerine or pentaerythritol. The polymeric ester is made by utilizing certain critical equivalent ratios of dimethyl terephthalate, for example, ethylene glycol and the polyhydric alcohol, e.g., glycerine. However, these coatings have generally inferior properties when compared with coatings from a linear polymer, e.g., polyethylene terephthalate.

Accordingly, it is an object of the present invention to prepare solutions of a polyester derived from a glycol or ester-forming derivative thereof and an aromatic dicarboxylic acid or ester-forming derivative thereof in a form suitable for use as a wire enamel.

Another object of this invention is to prepare a solution of such compositions which is higher in solids content than solutions known heretofore.

An additional object is to prepare a solution of such compositions which is free of other polymers.

Yet another object is to provide a wire having a coating of such compositions which exhibits superior electrical properties.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the foregoing objects can be attained by dispersing the linear polyester, e.g., polyethylene terephthalate, in a solvent comprising a chlorophenol, e.g., o-chlorophenol, m-chlorophenol and p-chlorophenol; an alkylated chlorophenol, such as p-chloro-m-cresol, 4 chloro-sec. butyl phenol and p-chlorothymol; or a mixture of these chlorophenols; a cresol, e.g., o-cresol, m-cresol, p-cresol, cresylic acid and a mixture of m-cresol and p-cresol; and phenol. For all or a portion of the phenol can be substituted one of the cresols or a mixture thereof.

Among the preferred solvent compositions are those containing one each of the groups of chlorophenols and cresols together with phenol, e.g., p-chlorophenol, o-cresol and phenol. Another preferred solvent mix comprises p-chlorophenol and cresylic acid, while a third preferred mix contains p-chlorophenol and m-p-cresol. The preferred chlorophenol is p-chlorophenol and the preferred cresol is o-cresol.

As previously stated, the solvent employed may include cresylic acid. Generally, the cresylic acid has a boiling range of 189° to 220° C. Cresylic acid is defined in Bennett's Concise Chemical and Technical Dictionary (1947), as a mixture of o-, m-, and p-cresols having a boiling range of 185° C. to 230° C.

As also previously stated, in place of all or a portion of the phenol, the individual cresols, e.g., o-, m-, or p-cresol, or a mixture thereof, e.g., m-p-cresol or cresylic acid, can be employed, but it is preferred to include phenol in the solvent mix. When dissolving a polyester in the preferred solvent mixture the chlorophenol may be employed in the range of 30 to 50%, based on the weight of the total solvent, the phenol in the range of 25 to 50% and the cresol in the range of 10 to 35%. If, as stated previously, a cresol is substituted for the phenol, the total cresol may be employed up to 70%.

It has also been found that with the use of the above solvent mixtures, solutions of the polymeric linear esters can be prepared which contain up to 21% solids content, and which remain stable for increased periods of time. The preferred range of solids content is between about 13% and 18% for solutions to be used for applying wire enamel, a solution containing a solids content of about 15% remaining stable for a year or more.

The polymeric esters contemplated by the present invention include products attained by reacting an aromatic dicarboxylic acid, e.g., terephthalic acid or isophthalic acid, or ester-forming derivatives thereof (including half-esters) such as the lower alkyl esters, e.g., those formed from methyl, ethyl, propyl, butyl, amyl, hexyl or heptyl alcohols or from phenol or its homologues with a glycol, including ethlene glycol, trimethylene glycol, tetramethylene glycol, pentamethylene glycol, hexamethylene glycol and even higher glycols, or ester-forming derivatives thereof, e.g., esters with low molecular weight carboxylic acids.

The polyesters may be formed by heating the ingredients, with or without the addition or catalysts to increase the rate of interaction under conditions such that any excess of glycol together with the reaction by-products are removed from the reaction zone. This removal may be facilitated by conducting the later stages of the heating under reduced pressure. The heating is continued, usually in the absence of oxygen, until filaments formed from a melt of the reaction can be cold drawn into permanently extended fibers. The reactions involved are firstly the esterification of the acid with the glycol and the formation of the appropriate glycol ester of the acid, and secondly the formation from this ester of polymers which are capable of being cold drawn as described above. Usually, when making a solution of a polyester which is to be employed as a wire enamel, a polyester with a minimum intrinsic viscosity of 0.5 is employed.

According to the present invention, the dispersion of the polyester is carried out under reflux conditions. The ingredients are heated generally within the range between 170° and 300° F., preferably between 230° and 260° F., and are agitated until the polyester is completely and homogenously dispersed.

The polyester compositions described herein are particularly adapted for use as wire enamels. The solution of the polymeric ester in chlorophenol and cresol, with or without phenol, can be applied to wire, e.g., copper wire or other metallic wire, by either of two methods conventionally employed in the wire enameling art. For example, it can be run by the "free dip" method. In this method, the polyester solution at its original strength is kept at room temperature in a tub, and the wire passes in a vertical direction through the tub, picking up enamel as it passes therethrough. Alternatively, the polyester solution can be used at original strength as a die application wire enamel. In this method aslo, the resin solution is placed in a tub at room temperature. The wire passes through the tub picking up enamel and is then squeezed in its vertical movement through dies which allow only a certain amount of coating to remain on the wire, the excess being stripped off by the narrow crevice of the die.

The wire coated in either of these processes is then baked in a wire enameling tower at conventional temperatures above the boiling point of the solvent mixture, e.g., 250° to 800° F., to complete the polymerization of the resin and to remove the solvent. Wire speeds of 15 to 30 feet/min., and preferably of 23 to 27 feet/min., can be employed. The entering temperature of the tower is about 250° F., increasing through the length to about 650° F. to 750° F. at the point of exit. The elevated temperature causes the solvent to be driven off, and as the wire travels into the higher temperature region, the polyester composition fuses onto the wire. Additional coats if necessary are applied by subsequent passing and baking until the desired thickness of between about 0.002 and about 0.004 inch is acquired, a coating between about 0.003 and 0.0033 inch being preferred.

The enamels of the present invention have outstanding electrical properties, including high dielectric strength, resistance to deterioration due to heat aging, good flexibility, and can be applied and baked at a variety of speeds and temperatures.

It has been found desirable that the enamel coated wire pass certain tests in order to be suitable for use at elevated temperatures for extended periods of time. The enameled wire prepared from the compositions of the present invention was tested and displayed distinctly superior qualities as shown by the following results:

(a) Dielectric strength (A.S.T.M. test D-149, short time) of wire coated with the product of this invention—2.600 volts per mil; whereas wire coated with polyamid type enamels shows at the same test only about 1200–1400 volts per mil dielectric strength.

(b) Scrape abrasion test (Nema Magnet Wire Standards MW–24–25, Edition November 1946) 25–35 strokes with a 700 gm. weight; whereas polyamid type enamel coated wire under the same conditions will pass only 15–20 strokes.

(c) Heat aging test (Nema Standards MW 24–40). The coated wire will pass winding around its 3 times diameter without cracking or crazing after 45 days aging at 125° C. (Nema Standards requirement 8 days); whereas polyamid type enamel coated wire under the same conditions will fail on the same 3 times diameter winding after 7 days' aging at 125° C.

In the following examples and throughout this specification and claims all parts are parts by weight, unless otherwise specified.

In Examples 1–11 the following procedure was used: The polymeric ester and the solvent mixture were placed in a flask provided with a reflux condenser, a thermometer and an agitator. The flask was then heated to a temperature between 230° to 260° F. and the agitator was started. Agitation was continued until the polymeric ester was completed and homogenously dispersed and the mixture was then applied to #18 A.W.G. wire by the die application procedure.

The coated wire was thereafter passed through a 12 foot tower at a wire speed of 27 ft./min. at an entering temperature of 200° F. and an exit temperature of 650° F. Six passes of the wire through the solution and tower were employed and the total build up of resin enamel on the wire in each case was about 0.003 inch.

*Example 1*

| | Grams |
|---|---|
| Polyethylene terephthalate | 170 |
| p-Chlorophenol | 330 |
| Cresylic acid | 500 |

The mixture was heated to a temperature of about 220° F. After the ester was completely and homogenously dispersed, the liquid composition had a viscosity of Y to Z and 17% solids content. The specific gravity was 1.156.

*Example 2*

| | Grams |
|---|---|
| Polyethylene terephthalate | 170 |
| p-Chlorophenol | 332 |
| o-Cresol | 166 |
| Phenol | 332 |

The mixture was heated to a temperature of about 220° F. The ester was completely and homogenously dispersed, the liquid composition having a viscosity of X to Y, 17% solids content and a specific gravity of 1.160

*Example 3*

| | Grams |
|---|---|
| Polyethylene terephthalate | 160 |
| p-Chlorophenol | 246 |
| m-p-Cresol (boiling range 200–205° C.) | 594 |

The mixture was heated to a temperature of about 220° F. After complete dispersion of the ester, the liquid composition had a viscosity of Y and 17% solids content with a specific gravity of 1.165.

In the following examples, solutions of a wide range of solids content in varying solvent mixtures within the scope of this invention are illustrated. These solutions may be employed as wire enamels in a manner such as set forth with regard to Examples 1–3.

*Example 4*

|  | Grams |
|---|---|
| Polyethylene terephthalate | 18 |
| p-Chlorophenol | 40 |
| o-Cresol | 20 |
| Phenol | 40 |

The mixture was heated to a temperature of about 220° F. and the ester completely dispersed. The solution had a viscosity of V to W and a solids content of 15.5%.

*Example 5*

|  | Grams |
|---|---|
| Polyethylene terephthalate | 510 |
| p-Chlorophenol | 1025 |
| m-p-Cresol | 1540 |

After heating the mixture to a temperature of about 220° F., the ester was completely dispersed. The solution had a viscosity of Y with 17.8% solids content.

*Example 6*

|  | Grams |
|---|---|
| Polyethylene terephthalate | 510 |
| p-Chlorophenol | 986 |
| m-p-Cresol | 493 |
| Phenol | 986 |
| Alpha-terpineol | 25 |

The mixture was heated to about 220° F. and the ester completely dispersed. The solution had a viscosity of Y and a solids content of 18%.

*Example 7*

|  | Grams |
|---|---|
| Polyethylene terephthalate | 510 |
| p-Chlorophenol | 1025 |
| m-p-Cresol | 900 |
| Phenol | 640 |
| Alpha-terpineol | 25 |

After the mixture was heated to about 220° F. and the ester completely dispersed, the solution had a viscosity of X to Y and a solids content of 16.8%.

*Example 8*

|  | Grams |
|---|---|
| Polyethylene terephthalate | 510 |
| p-Chlorophenol | 1025 |
| o-Cresol | 900 |
| Phenol | 640 |
| Alpha-terpineol | 25 |

The mixture was heated to about 220° F. After complete dispersion of the ester, the solution had a viscosity of X+ and a solids content of 16.8%.

*Example 9*

|  | Grams |
|---|---|
| Polyethylene terephthalate | 390 |
| p-Chlorophenol | 1010 |
| m-p-Cresol | 1010 |
| o-Cresol | 505 |
| Water | 48 |
| Alpha-terpineol | 29 |

The mixture was heated to about 220° F. and the ester completely dispersed. The solution had a viscosity of T to U and a solids content of 12.4%.

*Example 10*

|  | Grams |
|---|---|
| Polyethylene terephthalate | 600 |
| p-Chlorophenol | 950 |
| o-Cresol | 460 |
| Phenol | 950 |
| Alpha-terpineol | 25 |

After heating the mixture to about 220° F., the ester was completely dispersed. The solution had a viscosity of $Z_1$ to $Z_2$ and a solids content of 20.95%.

*Example 11*

|  | Grams |
|---|---|
| Polyethylene terephthalate | 510 |
| p-Chlorophenol | 986 |
| o-Cresol | 493 |
| Phenol | 986 |
| Alpha-terpineol | 25 |

The mixture was heated to about 220° F. After complete dispersion of the ester, the solution had a viscosity of X to Y and a solids content of 18%.

In Examples 4–11, the alpha-terpineol is added to the solvent mixture for the purpose of improving the odor of the solvent mixture. In Example 9, the water is present to improve the freeze-thaw stability of the enamel.

While in the examples solids contents of from about 12% to about 21% are illustrated for use as wire enamels, it is to be understood that less than 12% or more than 21% may be used, especially when the solution is to be employed for other purposes. These purposes include: bonding enamel for electric coils, insulating varnish for electric armatures, coating of steel cores for motors, dipping and encapsulating compound, and other related uses.

What is claimed is:

1. A composition of matter consisting essentially of a solution of polyethylene terephthalate in a solvent consisting essentially of monochlorophenol and a member selected from the group consisting of a cresol and mixtures of a cresol with phenol, said monochlorophenol being 30 to 50% of the weight of the total solvent.

2. The composition of claim 1 in which the solvent is a mixture of monochlorophenol, phenol and cresol.

3. The composition of claim 2 in which the phenol is present in an amount from 25 to 50% and the cresol is present in an amount from 10 to 35% based on the weight of the total solvent.

4. The composition of claim 2 in which the solvent is a mixture of about 40% p-chlorophenol, about 40% phenol and about 20% of a cresol selected from the group consisting of o-cresol and m-p-cresol.

5. The composition of claim 2 in which the solvent is a mixture of about 40% p-chlorophenol, about 25% phenol and about 35% of a cresol selected from the group consisting of o-cresol and m-p-cresol.

6. The composition of claim 1 in which the solvent is a mixture of from 30 to 50% monochlorophenol and from 70 to 50% cresol, based on the weight of the total solvent.

7. A wire enamel comprising a solution of about 12 to about 21% polyethylene terephthalate in a solvent comprising 30 to 50% monochlorophenol, 25 to 50% phenol and 10 to 35% cresol, based on the weight of the total solvent.

8. The enamel of claim 7 in which the solvent is a mixture of about 40% p-chlorophenol, about 40% phenol and about 20% o-cresol.

9. A composition of matter consisting essentially of a solution of 12 to 21% of polyethylene terephthalate in a solvent consisting essentially of monochlorophenol, and a member selected from the group consisting of a cresol and mixtures of a cresol with phenol, the monochlorophenol being employed in an amount sufficient to retain the polyethylene terephthalate in solution.

10. A composition according to claim 9 wherein the polyethylene terephthalate is present in an amount of not over 18%.

11. A composition of matter according to claim 9 wherein the monochlorophenol is p-chlorophenol.

12. A composition of matter according to claim 1 wherein the monochlorophenol is p-chlorophenol.

13. A composition of matter according to claim 1 wherein the polyethylene terephthalate is present in an amount of 12 to 21%.

14. A method of coating an electrical conductor with polyethylene terephthalate consisting essentially of depositing the polyethylene terephthalate on the conductor from a solution of 12 to 21% polyethylene terephthalate in a solvent consisting essentially of monochlorophenol, and a member selected from the group consisting of a cresol and mixtures of a cresol with phenol, the monochlorophenol being employed in an amount sufficient to retain the polyethylene terephthalate in solution, and removing the solvent.

References Cited in the file of this patent

UNITED STATES PATENTS

| | | |
|---|---|---|
| 2,497,376 | Swallow et al. | Feb. 14, 1950 |
| 2,861,969 | De Witt et al. | Nov. 25, 1958 |
| 2,894,934 | Burkhard | July 14, 1959 |
| 2,905,657 | Huffman | Sept. 22, 1959 |
| 2,924,500 | Huffman et al. | Feb. 9, 1960 |
| 2,982,754 | Sheffer et al. | May 2, 1961 |
| 3,042,646 | Beindorff et al. | July 3, 1962 |